(12) United States Patent
Yiu

(10) Patent No.: US 6,798,573 B2
(45) Date of Patent: Sep. 28, 2004

(54) DEVICE FOR GENERATING A 3-D IMAGE FROM TWO 2-D PICTURES

(76) Inventor: Chih-Hao Yiu, 7-1 Fl., No. 30, Lin-Sen, Taichung City (TW)

( * ) Notice: Subject to any disclaimer, the term of this patent is extended or adjusted under 35 U.S.C. 154(b) by 0 days.

(21) Appl. No.: 10/406,907

(22) Filed: Apr. 3, 2003

(65) Prior Publication Data

US 2003/0210463 A1 Nov. 13, 2003

Related U.S. Application Data

(63) Continuation-in-part of application No. 09/922,582, filed on Aug. 6, 2001, now abandoned, and a continuation-in-part of application No. 09/573,948, filed on May 19, 2000, now abandoned.

(51) Int. Cl.⁷ .......................... G02B 27/22; G02B 27/24
(52) U.S. Cl. ...................... 359/464; 359/462; 359/472; 359/474; 359/477

(58) Field of Search ................................. 359/462, 464, 359/472, 474, 477, 480; 40/365

(56) References Cited

U.S. PATENT DOCUMENTS 5,894,365 A * 4/1999 Gasper ........................ 359/474
5,953,170 A * 9/1999 Glancy ........................ 359/896

* cited by examiner

Primary Examiner—Audrey Chang
(74) Attorney, Agent, or Firm—Charles E. Baxley

(57) ABSTRACT

A device for generating a 3-D image includes a tubular body with liquid filled therein and two protrusion portions extrude from one side of the body. Two stereoscopically related two-dimensional pictures are located on another side opposite to the side having the two protrusion portions. A 3-D image is seen when viewing the two pictures via the two protrusion portions.

2 Claims, 7 Drawing Sheets

DEVICE FOR GENERATING A 3-D IMAGE FROM TWO 2-D PICTURES

This application is a Continuation-In-Part application of applicant's former U.S. patent application with Ser. No. 09/922,582, filed Aug. 6, 2001 now abandoned with the same title and is a continuation-in-part of Ser. No. 09/573, 948 filed May 19, 2000, now abandoned.

FIELD OF THE INVENTION

BACKGROUND OF THE INVENTION

FIG. 5 illustrates how our eyes 16 distinguish the distances between two objects 10, 11 from the eyes 16. An angle 17 between our two eyes 16 and the object 10/11 is called "optical angle" which decides the distance that the viewer feels. A smaller optical angle means a distance between the object and the eyes 16 is longer than a distance between the object and the eyes with a larger optical angle. Referring to FIG. 6, an angle between the eye 16 and an outer periphery of an object 12/13 is called "visual angle" 15/14. A larger visual angle means a larger object. FIG. 7 shows a conventional means 20 for generating a 3-D image. The means 20 has two lenses 21, 22 which are flashed and darkened alternatively when viewing an object. In other words, only one image message is sent to the user's brain at a time and the image messages viewed from the two lenses 21, 22 are sent to the user's brain alternatively because the operation of the two lenses 21, 22. The user's brain will combine the image messages alternatively sent according to the images viewed from the two lenses 21, 22 into a 3-D image. The means has a complicated structure and is expensive so that it is not affordable for most of the users. Furthermore, the means 20 can only provide the function for one person who wears the means 20.

U.S. Pat. No. 5,894,365 discloses a collapsible viewer that is composed of three individual basic items which are front wall with two pictures, a middle wall with two openings, and a rear wall with two plano-convex lenses which are engaged with the rear wall. The top edges of the front wall and the rear wall are connected with each other by adhesive, and the bottom edges of the front wall, the middle wall and the rear wall are connected with each other by adhesive. It is to be noted that the height of the middle wall is shorter than the height of each of the front wall and the rear wall so that the viewer has to bow the front wall and the rear wall till a resistance is felt when the top edge of the middle wall contacts the connection of the respective top edges of the front wall and the rear wall. The locations of the openings in the middle wall have to precisely match with the positions of the two plano-convex lenses on the rear wall or the viewers cannot successfully see the image via the two lenses. Obviously, it needs a certain degree of skill to bow the front wall and the rear wall to put the openings and the lenses and the pictures in alignment with each other. Once the front wall or the rear wall is folded too much and loose its continuous smooth curvature, the lenses cannot be located in proper positions. Not only children but adults may easily fold the flexible, cardboard or plastic made front wall and the rear wall to destroy the continuous smooth curvature, this makes the collapsible viewer to loose its function quickly. Besides, the three items are individual ones so that the assemblers have to assemble them properly and the two plano-convex lenses have to be securely engaged with the rear wall by proper ways so that they can be located in alignment with the openings in the middle wall. Before the users may successfully obtain the expected images, certain processes and adjustments are taken as mentioned above to bow the front wall and the rear wall, and these processes and adjustments obviously are not an easy task for the users who are not able to properly control their bending force to bow the front wall and the rear wall as desired. Frustration is then arisen for those users.

U.S. Pat. No. 5,953,170 discloses a container label having a coded image which can be decoded by viewing from two windows attached with color filters. The two windows with color filters are a part of the label and the label could be easily contaminated or torn. The color filters may also be peeled off from the label and once the color filters are removed, no function can be expected. Besides, the container is a normal bottle which has a smooth outer periphery and cannot provide any feature that is related to conduction of three dimensional images.

Accordingly, the two references of the prior art have inherent shortcomings because of their specific structure and the way that they are operated.

The present invention intends to provide a simple device to generate a 3-D image by viewing two stereoscopically related pictures from two protrusion portions on an outer periphery of a bottle. The device has strong structure so that the users can use it for a long period of time without worrying about weakness of the structure as the disclosures mentioned above.

SUMMARY OF THE INVENTION

In accordance with one aspect of the present invention, there is provided a device for generating a 3-D image by viewing two stereoscopically related 2-D pictures. The device comprises a body filled with liquid and two protrusion portions are formed to the body. A convex profile is defined on an outside of the protrusion portion and a concave profile is defined in an inside of the body corresponding to the protrusion portion. Two stereoscopically related two-dimensional pictures are put on an opposite side to the protrusion portions of the body. A 3-D image is obtained when viewing from the protrusion portions.

The object of the present invention is to provide simple device that can generate a 3-D image from two stereoscopically related 2-D pictures by viewing from two protrusion portions on the body of the device.

These and further objects, features and advantages of the present invention will become more obvious from the following description when taken in connection with the accompanying drawings which show, for purposes of illustration only, two embodiment in accordance with the present invention.

DETAILED DESCRIPTION OF THE PREFERRED EMBODIMENTS

Figure 1:
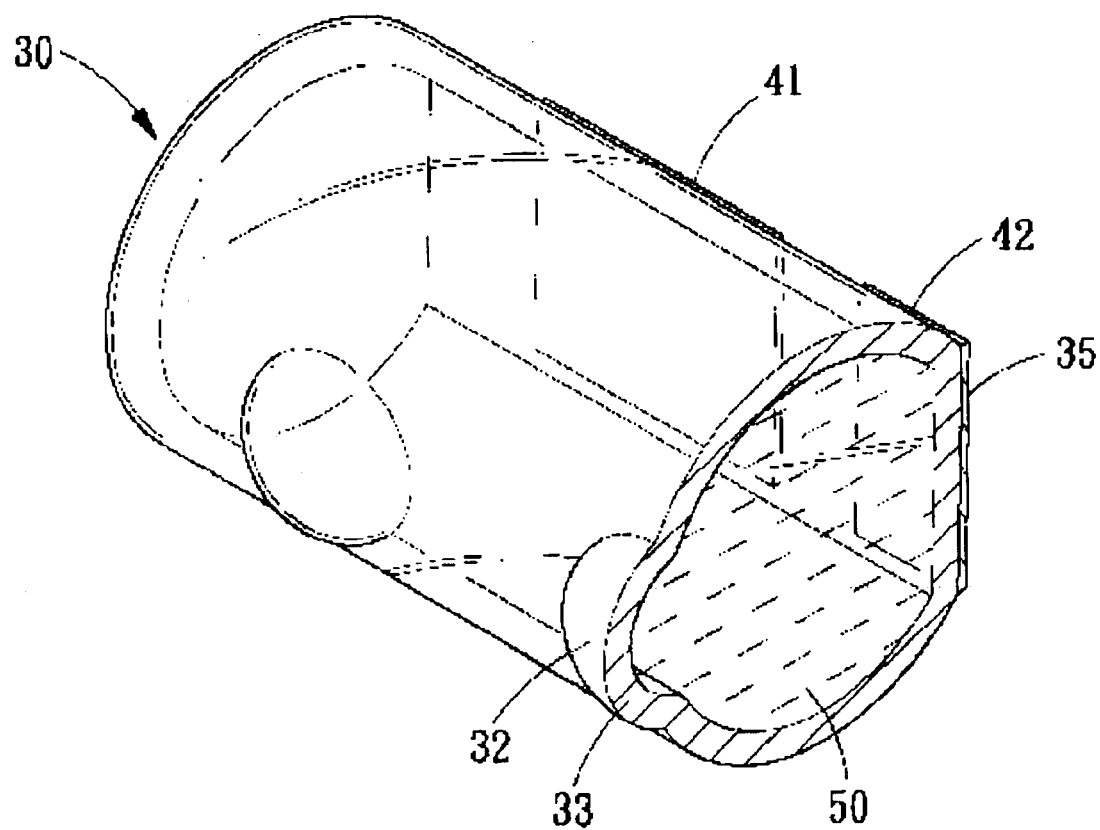
FIG. 1 is a perspective view to show the device of the present invention wherein a section of the tubular body is removed for illustrative purpose.
Figure 2:
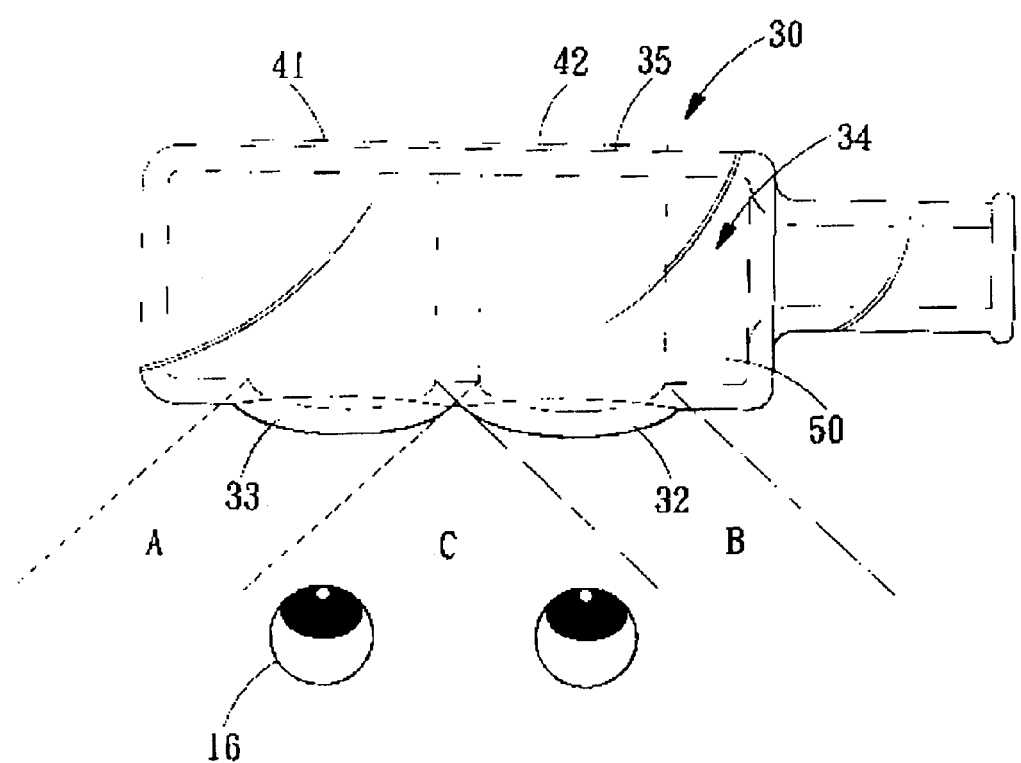
FIG. 2 is an illustrative view to show that an overlapped portion "C" is formed between two images viewed from the two protrusion portions of the device of the present invention.

Referring to FIGS. 1 and 2, the device for generating a 3-D image in accordance with the present invention comprises a hollow transparent tubular body 30 which can be a transparent bottle having an interior 34 in which liquid 50 such as water is filled. Two transparent protrusion portions 33 are integrally formed on an outer periphery of the tubular body 30 and each protrusion portion 33 is integrally formed from the body 30. Each protrusion portion 33 has a convex outer surface 32 on an outside of the tubular body 30 and a concave portion defined in an inside of the body 30. The protrusion portions 33 each have a unique thickness. The two protrusion portions 33 may perform as two convex-concave lenses when the hollow transparent tubular body 30 is filled with water. A plain surface 35 is defined on the outside of the tubular body 30 and located in opposite to the protrusion portions 33. Two stereoscopically related two-dimensional pictures 41, 42 are connected to the plain surface 35. A viewer views the two pictures 41, 42 from the outside of the tubular body 30 via the two protrusion portions 33 while liquid such as water is filled in the body 30. As shown in FIG. 2, area "A" represents the image viewed via the protrusion member 33 on the left side in FIG. 2. Area "B" represents the image viewed via the protrusion portion 33 on the right side in FIG. 2. An overlapped portion "C" is formed between the two images "A" and "B", and the image "C" will be a 3-D image. The water reflects the direction of light when the viewer views from the protrusion portions 33.

Figure 3:
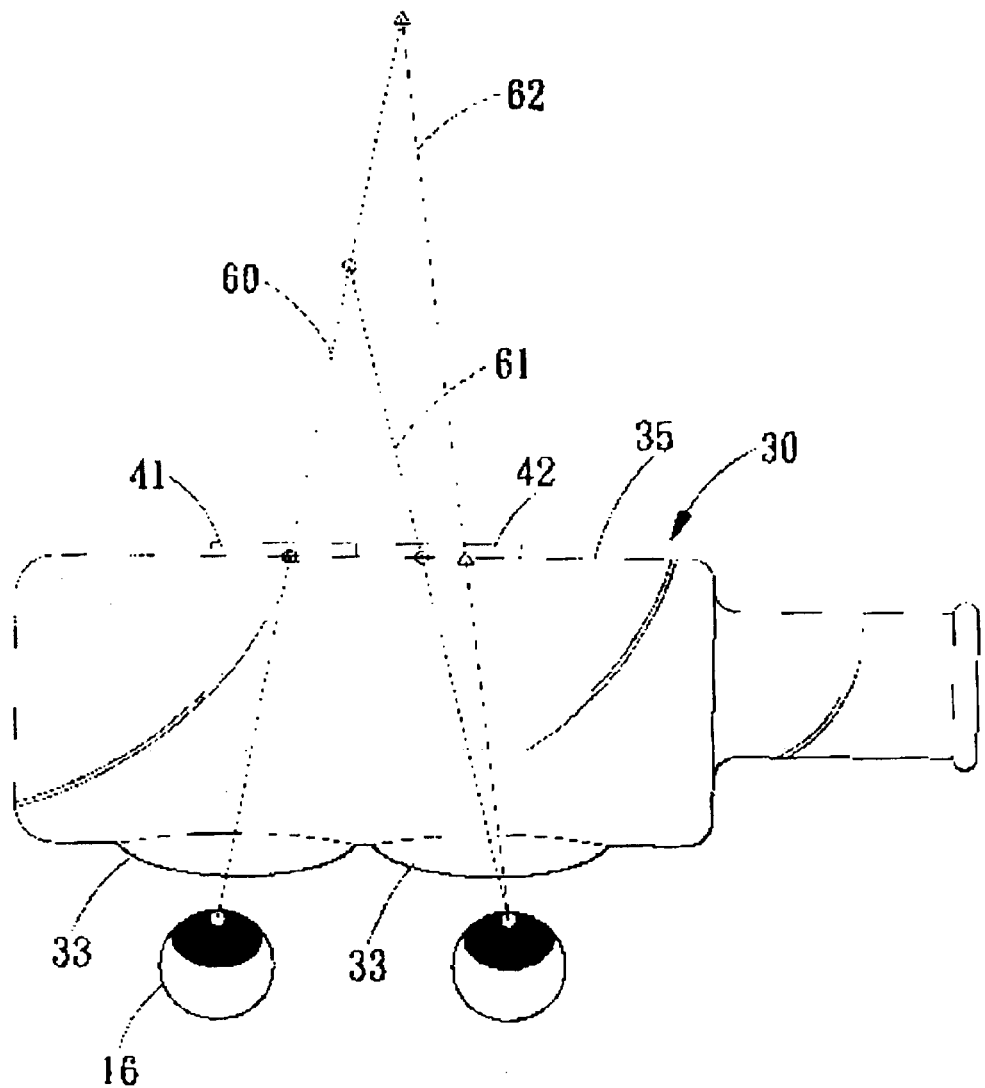
FIG. 3 is an illustrative view to show how a depth of field of a 3-D image can be achieved in the device of the present invention.

As shown in FIG. 3, if an object that the two eyes view has a triangle point and a circle point. The triangle point and the circle point are assumed to be located at the identical point on the picture 41 obtained in left eye of the viewer. The triangle point and the circle point are separated on the picture 42 obtained in right eye of the viewer because of parallax. When the two pictures 41, 42 are located on the plain surface 35, a view line 60 is established by connecting the identical point on picture 41 and the left eye 16. Another view line 61 is established by connecting the circle point on picture 42 and the right eye 16, and an image for the circle point will be presented on the spot where the two view lines 60 and 61 intersects. Yet another view line 62 is established by connecting the triangle point on picture 42 and the right eye 16, and an image for the triangle point will be presented on the spot where the two view lines 60 and 62 intersects. Therefore, there is a distance or depth between the circle and the triangle on view line 60 so that the viewer sees a 3-D image.

Figure 4:
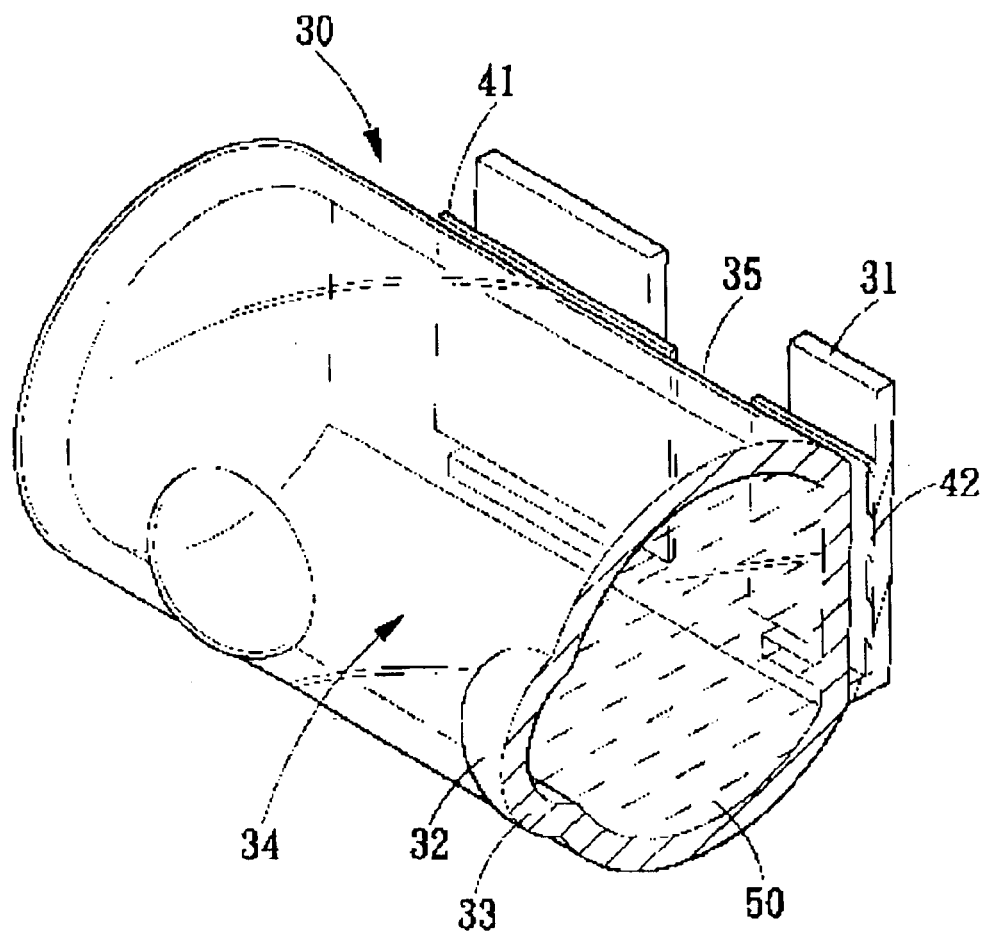
FIG. 4 shows two support plates are used to position the two pictures on the plain surface of the device.
Figure 5:
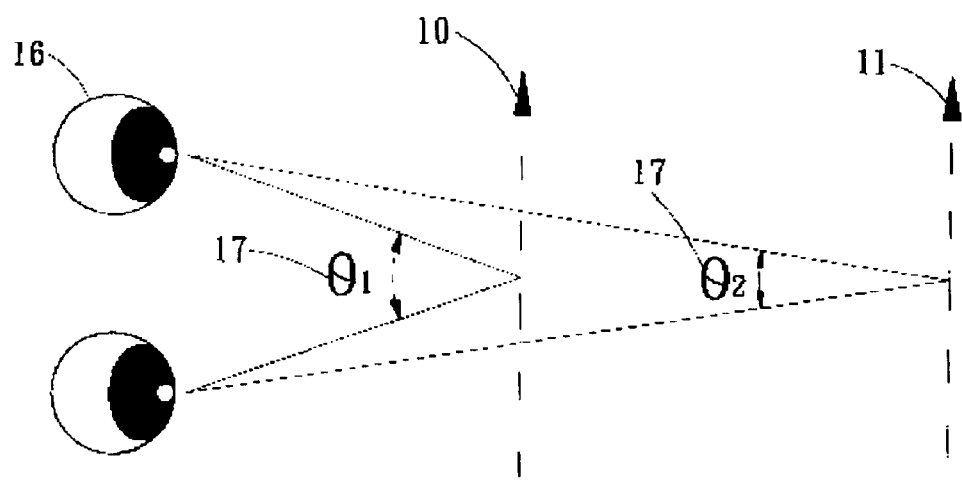
FIG. 5 shows that a distance between an object and eyes is proportional to an optical angle between the object and the eyes.
Figure 6:
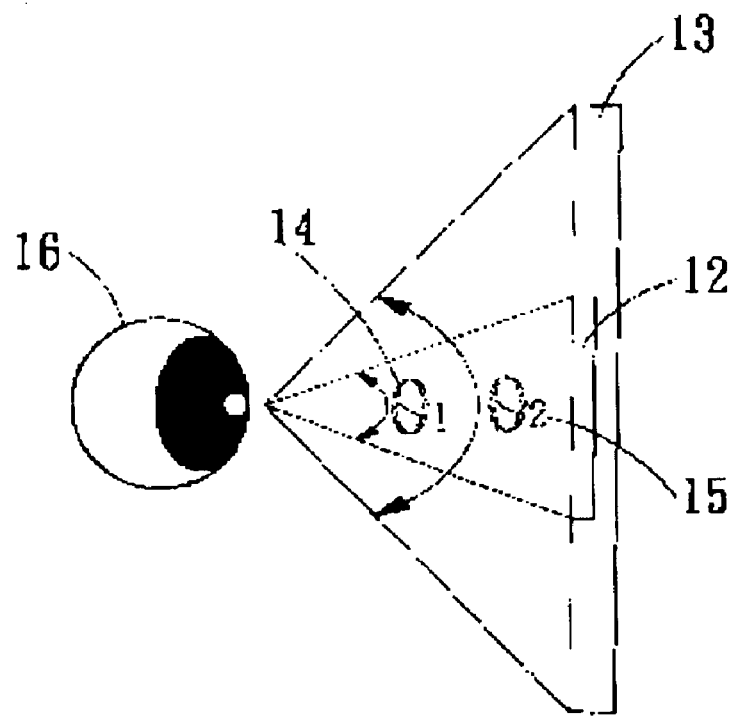
FIG. 6 shows that a size of an object is proportional to a visual angle between an outer periphery and an eye.
Figure 7:
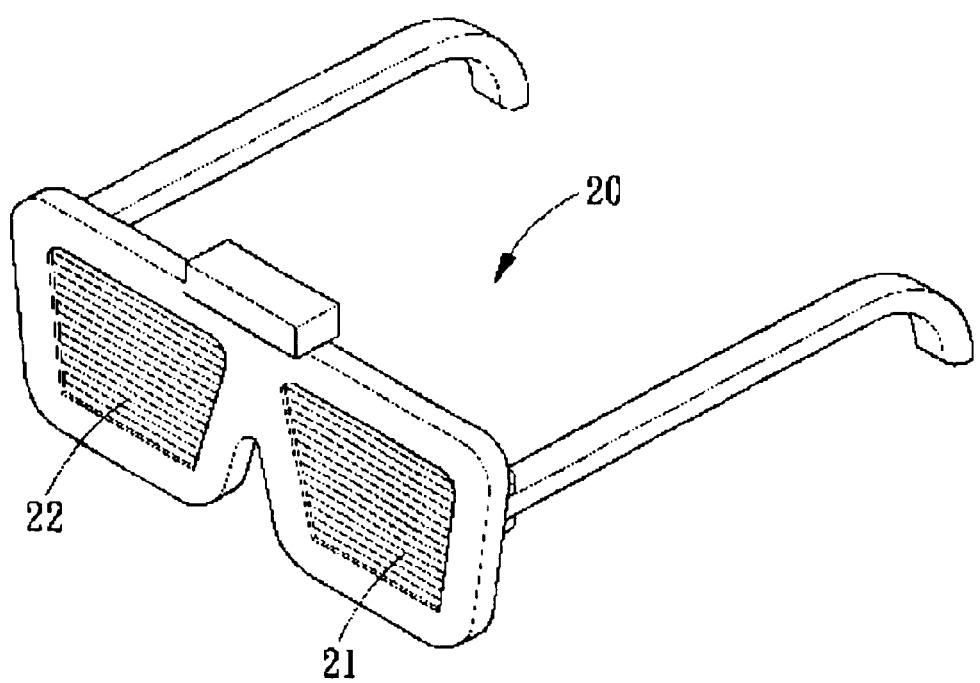
FIG. 7 is a perspective view to show a conventional means for generating a 3-D image.

Referring to FIG. 4, two support plates 31 are put behind the tubular body 30 and a gap is defined between the plain surface 35 and the support plates 31. The two stereoscopically related two-dimensional pictures 41, 42 are clamped to be positioned between the two support plates 31 and the plain surface 35.

By the device of the present invention, a 3-D image is easily to get and only limited cost is required. The pictures 41, 42 may also be integrally formed to the body 30 or by any known method. Furthermore, not like the disclosure by U.S. Pat. No. 5,894,365, the device of the present invention needs not any skill to bending or bowing so that no processes need to be taken, the users simply view the pictures 41, 42 via the two protrusion portions 33 can get the 3-D images. Not like the disclosure by U.S. Pat. No. 5,953,170, the device of the present invention needs no color filters and no label has to be glued to the body.

While we have shown and described various embodiments in accordance with the present invention, it should be clear to those skilled in the art that further embodiments may be made without departing from the scope of the present invention.

What is claimed is:

1. A device for generating a 3-D image comprising:
    a hollow tubular body in which liquid is filled;
    two transparent protrusion portions integrally protruding from an outer periphery of a first side of said body and each of said protrusion portions having a unique thickness, a plain surface defined in a second side which is in opposite with said first side of the hollow tubular body, and
    two stereoscopically related two-dimensional pictures located on said second side.

2. The device as claimed in claim 1, wherein two support plates are connected to said tubular body and a gap is defined between said plain surface and each of said support plates, said two stereoscopically related two-dimensional pictures located in said two respective gaps.

* * * * *